United States Patent
Wong et al.

(10) Patent No.: US 7,299,448 B2
(45) Date of Patent: Nov. 20, 2007

(54) CONTEXT-SENSITIVE ATTRIBUTES

(75) Inventors: Janette S. J. Wong, North York (CA); Balasingham Balakumaran, Toronto (CA); Richard T. Goodwin, Dobbs Ferry, NY (US); Mark W. Hubbard, Maple (CA); Jacob T. Vandergoot, Bradford (CA); Yi (Andy) Zhuang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/403,905

(22) Filed: Mar. 28, 2003

(65) Prior Publication Data

US 2004/0189685 A1    Sep. 30, 2004

(51) Int. Cl.
   *G06F 9/44*   (2006.01)
(52) U.S. Cl. ...................................... 717/114
(58) Field of Classification Search ............. 717/114, 717/116, 101
   See application file for complete search history.

(56) References Cited

U.S. PATENT DOCUMENTS

| | | | |
|---|---|---|---|
| 5,295,266 A * | 3/1994 | Hinsley et al. | 718/101 |
| 5,404,428 A * | 4/1995 | Wu | 345/619 |
| 5,765,154 A * | 6/1998 | Horikiri et al. | 707/10 |
| 5,842,223 A * | 11/1998 | Bristor | 707/204 |
| 6,405,211 B1 * | 6/2002 | Sokol et al. | 707/103 Y |
| 6,453,324 B1 | 9/2002 | Baisley et al. | 707/203 |
| 6,793,142 B2 * | 9/2004 | Yap | 235/492 |
| 2001/0043231 A1 * | 11/2001 | Abbott et al. | 345/700 |

FOREIGN PATENT DOCUMENTS

| | | |
|---|---|---|
| WO | WO 01/49675 A1 | 7/2001 |
| WO | WO 01/75570 A2 | 10/2001 |
| WO | WO 02/03646 A2 | 1/2002 |
| WO | WO 02/41218 A2 | 5/2002 |

OTHER PUBLICATIONS

Glenn Ammons, et al. "Exploiting Hardware Performance Counters with Flow and Context Sensitive Profiling", May 1997, ACM Press, vol. 32, ussue 5, pp. 85-96.*

Xiaohua H., et al; "Learning maximal generalized decision rules via discretization, generalization and rough set feature selection", *Proceedings Ninth IEEE International Conference on Tools with Artificial Intelligence*, pp. 548-556, 1997 (Abstract Only).

Xiaohua H., et al, "Data mining via discretization, generalization and rough set feature selection", *Knowledge and Information Systems*, vol. 1, No. 1, pp. 33-60, Feb. 1999 (Abstract Only).

(Continued)

*Primary Examiner*—Wei Zhen
*Assistant Examiner*—Anna Deng
(74) *Attorney, Agent, or Firm*—Konrad Raynes & Victor LLP; Janaki K. Davda

(57) ABSTRACT

A mechanism to enable context-sensitive attributes which comprise an attribute value and a context value defining the applicability of the attribute value in a computer application. The mechanism is adapted to manipulate the context-sensitive attributes, for example to facilitate creation of attribute values with associated context values, retrieve attribute values associated with a specific context value and search based on attribute values within a context value.

27 Claims, 6 Drawing Sheets

OTHER PUBLICATIONS

Xiaohua H., et al, "Discovering maximal generalized decision rules through horizontal and vertical data reduction", *Computational Intelligence*, vol. 17, No. 4, pp. 685-702, Nov. 2001 (Abstract Only).

Jaeger, T. et al; "Flexible Control of Download Executable Content", *ACM Transactions on Information and System Security*, vol. 2, No. 2, pp. 177-228, May 1999.

* cited by examiner

| Attribute 402 | Context Value 406 | Attribute Value(s) 408 |
|---|---|---|
| FavoriteFood | 409 | peanut butter sandwich, orange, papaya, coffee |
| | com.ibm.websphere.commerce.store.VegetarianCuisine | tofu, black beans, lentils |
| | com.ibm.websphere.commerce.store.BurgerJoint | fries, Big Double |
| PreferredCurrency 404 | 409 | $CDN |
| | www.vacationplanner.com 410 | $USD |

```
public interface Attribute extends Serializable {
    String getName();
        // returns the attribute name
    int size();
        // returns the total number of attribute values
        // in this data object
    Object getValue();
        // returns one attribute value. If multi-valued,
        // no guarantee which one is returned since values
        // are not ordered.
    List getValues();
        // returns multiple attribute values or one value
        // if single valued
    boolean addValue(Object attributeValue);
        // adds an attribute value
    boolean addValues(List attributeValues);
        // adds a list of attribute values
    List setValue(Object attributeValue);
        // replaces all the values with the specified
        // value returns the values replaced
    List setValues(List attributeValues);
        // replaces all the values with the specified values
        // returns the values replaced
    boolean removeValue(Object attributeValue);
    void removeValues();

```
public interface ContextAttribute extends Attribute {
    String[] getContexts();
        // returns context strings for the values in the
        // data object; if none, returns null or zero-
        // length array
    List getValues(String context);
        // get values with a specific context
    Map getAllValues();
        // get all attribute values, regardless of
        // context; the string representing null is used as
        // the key for the values with no context
    boolean addValue(String context, Object attributeValue);
        // adds an attribute value with a context
    boolean addValues(String context, List attributeValues);
        // adds multiple attribute values with a context
    List setValue(String context, Object attributeValue);
        // replaces all the values with this value and
        // specified context returns the values replaced
    List setValues(String context, List attributeValues);
        // replaces all the values with this list of values
        // and specified context; returns the values replaced
    Map setAllValues(Map attributeValues);
        // replaces (all) the values with the specified
        // contexts and values; Use the string representing
        // null as the key for the attribute values with no
        // context
}
```

FIG. 5B

… # CONTEXT-SENSITIVE ATTRIBUTES

TECHNICAL FIELD

The invention relates to data attributes and more particularly to attribute values associated with a context value.

BACKGROUND OF THE INVENTION

A particular attribute value for a data attribute may only be applicable (i.e. true) in a certain situation. Applications that share use of the attribute need to know about the situation when the attribute value is true in order to make proper use of the attribute. For example, the value of a telephone number attribute "telephoneNumber" for a person may only be applicable during a particular time of day or may represent a home, business, mobile, facsimile or other telephone number.

Data attributes are often shared among multiple applications, such as in business applications for conducting electronic commerce (e-commerce, whereby transactions for a variety of goods and services are conducted electronically) or electronic business (e-business, whereby business processes—e.g., shipping, procurement, staffing, etc.—are transformed so as to be conducted electronically). A situation under which an attribute value is applicable may be specific to a particular application. Consider an attribute "preferredDessert" representing a person's preferred dessert of "ice cream". For an application that manages data about dessert preferences in various restaurants, it may be desirable for that application to associate a restaurant with the preferredDessert attribute value "ice cream" to indicate that the person likes that dessert in the particular restaurant. A further application may track dessert preferences under different seasons and associate the preferredDessert attribute value "ice cream" with the season "summer". Consider further a purchasing application that may gather cost or quantity information from a variety of supplier sources. Pricing information may be represented in a supplier's preferred currency (erg. $, , and ¥) or quantity of a particular supply in a variety of units of measure (e.g. ton and tonne, lb and kg). A sales or an inventory application may wish to represent the same attributes in different currency or measure units.

A typical solution to relate an attribute value such as "ice cream" with further information such as the preferred season for eating ice cream or the preferred restaurant for purchasing ice cream is to create an attribute for each of the different situations or contexts. That is, a typical solution is to create the attributes "preferredDessert_Spring", "preferredDessert_ Summer", etc. to represent the seasonal dessert preferences.

A drawback associated with using different attributes for the different contexts is that such contexts must typically be anticipated in advance and must remain constant. In the example above, the seasons are known and are constant. But often, contexts change or are not known in advance and as such using different pre-defined attributes is not ideal or even feasible. If dessert preferences need to be tracked according to restaurant name, for example, the names may not be known in advance and may change. Using multiple different attributes may also be cumbersome when there are many contexts.

In a data sharing environment where data are shared among many applications, some contexts are only meaningful to a single application. A proliferation of attributes for a context having narrow usage is wasteful of resources.

A solution to some or all of these shortcomings is therefore desired.

SUMMARY OF THE INVENTION

In accordance with an aspect of the invention, there is provided a mechanism for enabling context-sensitive attributes which comprise an attribute value and a context value defining the applicability of the attribute value. The data system comprises a first mechanism for defining a context-sensitive attribute and a second mechanism to manipulate the context-sensitive attributes, for example, to facilitate creation of an attribute value with an associated context value, retrieve an attribute value associated with a specific context value and search based on an attribute value within a context value. The mechanism may permit a sharing of the attribute values and associated context values among a plurality of applications sharing the context-sensitive attributes. In accordance with another aspect of the invention, there is provided a computer program product for enabling such a mechanism. In accordance with yet a further aspect there is a method of providing a context-sensitive attribute for use by an application. The method comprises storing an attribute value; storing a context value associated with the attribute value for defining the applicability of the attribute value; and providing a mechanism for manipulating the attribute value and the context value. In accordance with a further aspect, there is provided an attribute manager for enabling the use of an attribute by an application, said attribute manager comprising a mechanism for use by said application for manipulating a context-sensitive attribute comprising an attribute value and a context value associated with the attribute value for defining the applicability of the attribute value.

Since multiple attributes do not need to be defined for the different context values, the invention allows context values that are unknown until runtime to be used and allows the context values to be changed providing flexibility. If many context values exist, a proliferation of attributes may be avoided supporting enhanced scalability.

BRIEF DESCRIPTION OF THE DRAWINGS

Further features and advantages of the present invention will become apparent from the following detailed description, taken in combination with the appended drawings, in which:

FIG. 4 illustrates a portion of the memory of FIG. 3 showing a context-sensitive attribute; and FIGS. 5A and 5B show a code sample providing a programming interface for context-sensitive attributes.

It will be noted that throughout the appended drawings, like features are identified by like reference numerals.

DETAILED DESCRIPTION OF THE PREFERRED EMBODIMENT

Figure 1:
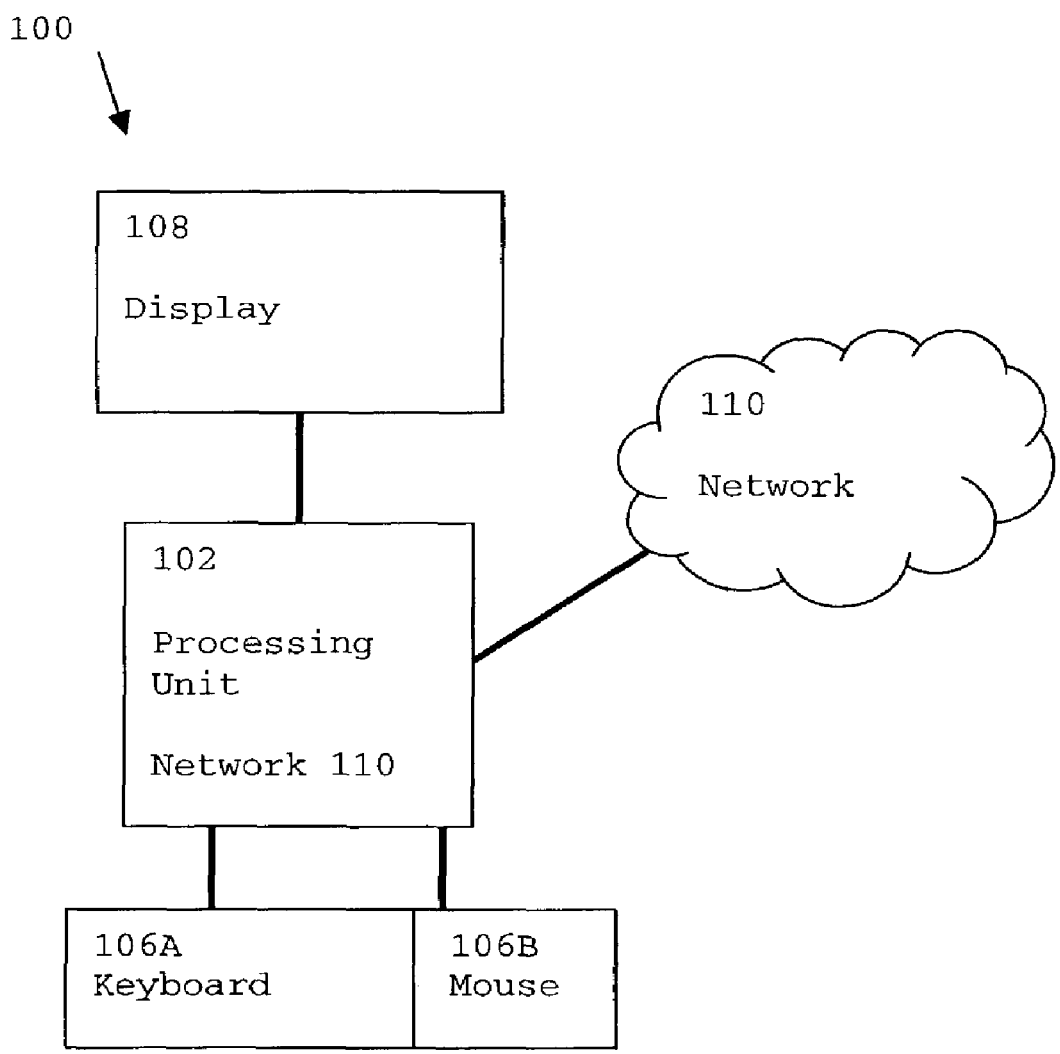
FIG. 1 schematically illustrates a computer system embodying aspects of the invention.

An embodiment of the invention, computer system 100, is illustrated in FIG. 1. Computer system 100, which is illustrated for exemplary purposes as a computing device, is adapted to communicate with other computing devices (not shown) using network 110. As will be appreciated by those of ordinary skill in the art, network 110 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100, using one or more networks such as, for example network 110. However, for ease of understanding, aspects of the invention have been embodied in a single computing device—computer system 100.

Computing device 100 typically includes a processing system 102 which is enabled to communicate with the network 110, various input devices 106, and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 102. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
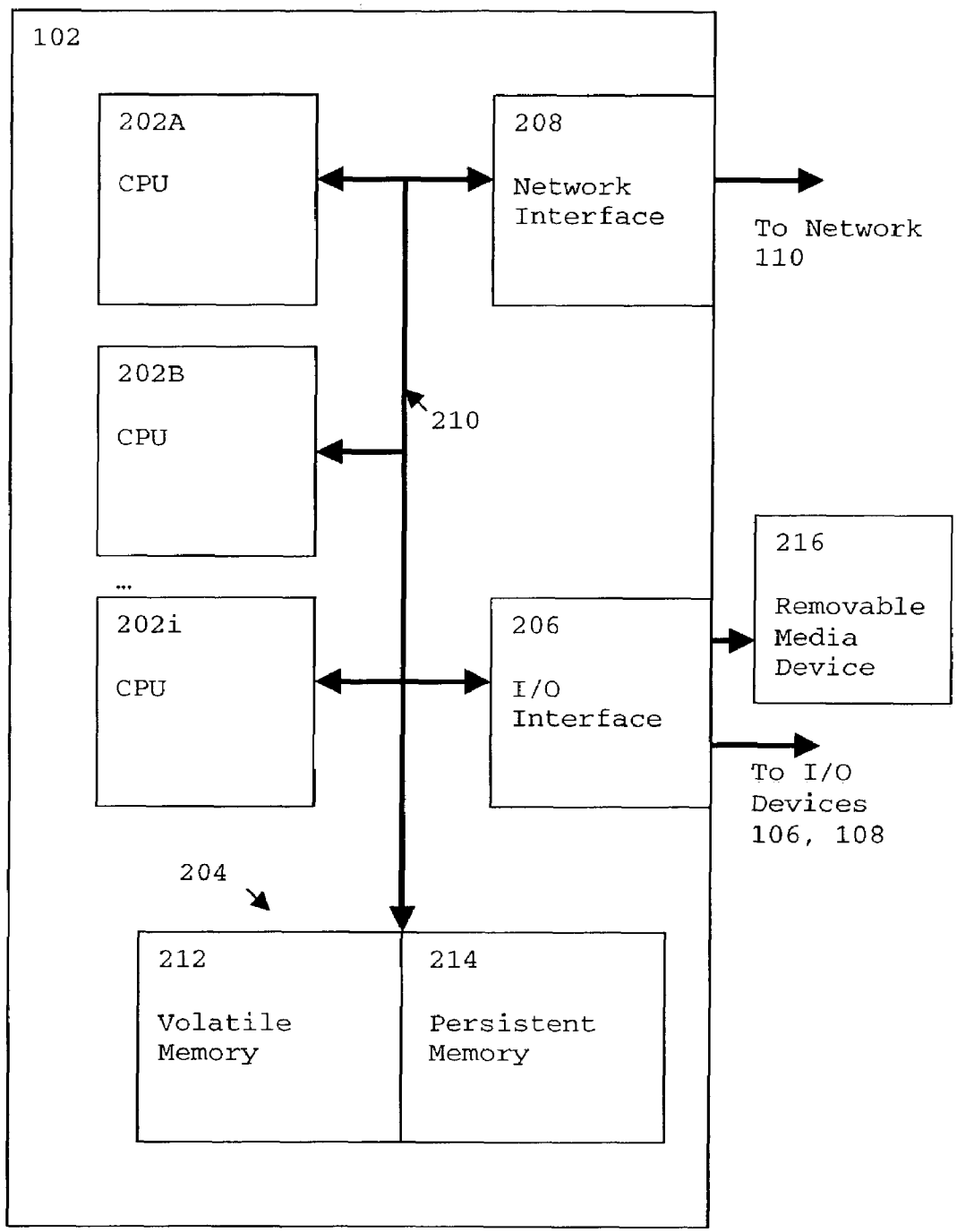
FIG. 2 schematically illustrates in greater detail a portion of the computer system of FIG. 1.

Exemplary processing system 102 is illustrated in greater detail in FIG. 2. As illustrated, processing system 102 includes a number of components: a plurality of central processing units (CPUs) 202A, 202B, . . . 202i, collectively 202; memory 204; network interface (I/F) 208; and input-output (I/O) interface 206. Communication between various components of the processing system 102 may be facilitated via a suitable communications bus 210 as required.

Each CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 102 could use alternative CPUs and may include embodiments in which one CPU is employed (not shown). CPUs 202 may include various support circuits to enable communication between CPUs 202 and the other components of processing system 102.

Memory 204 includes both volatile memory 212 and persistent memory 214 for the storage of: operational instructions for execution by CPUs 202; data registers; application and thread storage; and the like. Memory 204 preferably includes a combination of random access memory (RAM), read only memory (ROM), and persistent memory such as that provided by a hard disk drive.

Network I/F 208 enables communication between other computing devices (not shown) and other network computing devices via network 110. Network I/F 208 may be embodied in one or more conventional communication devices. Examples of a conventional communication device include: an Ethernet card; a token ring card; a modem, or the like. Network I/F 208 may also enable the retrieval or transmission of instructions for execution by CPUs 202, from or to a remote storage media or device via network 110.

I/O interface 206 enables communication between processing system 102 and the various I/O devices 106 and 108. I/O interface 206 may include, for example a video card for interfacing with an external display such as output device 108. Additionally, I/O interface 206 may enable communication between processing system 102 and a removable media device 216. Removable media 216 may comprise a conventional diskette or other removable memory devices such as Zip™ drives, flash cards, CD-ROMs, static memory devices, and the like. Removable media 216 may be used to provide instructions for execution by CPUs 202 or as a removable data storage device.

Figure 3:
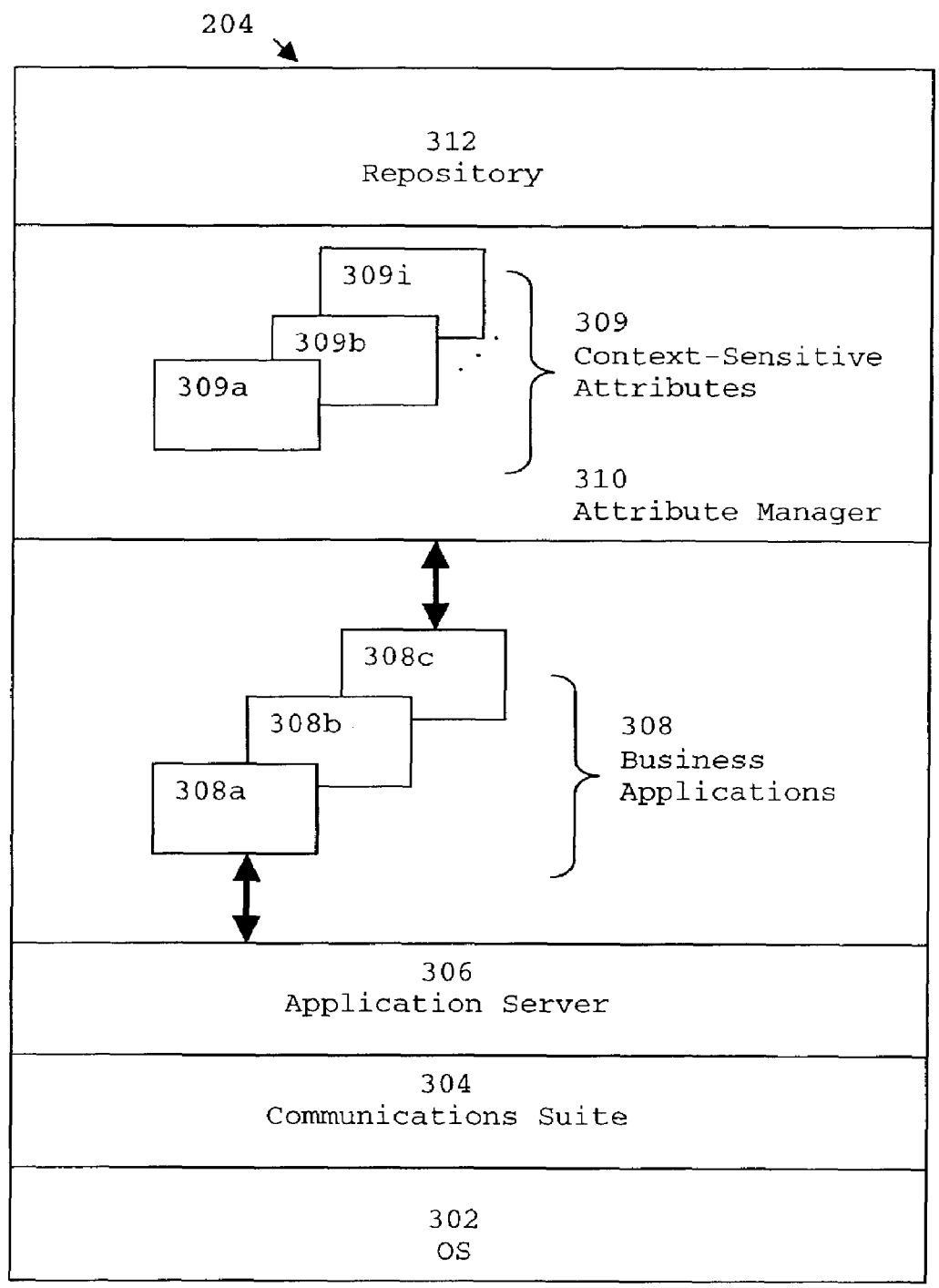
FIG. 3 illustrates in functional block form a portion of the memory illustrated in FIG. 2.

The computer instructions/applications and related data stored in memory 204 and executed by CPUs 202 (thus adapting the operation of computer system 100 as described herein) are illustrated in functional block form in FIG. 3. As will be appreciated by those of ordinary skill in the art, the discrimination between aspects of the applications illustrated as functional blocks in FIG. 3, is somewhat arbitrary in that the various operations attributed to a particular application as described herein may, in an alternative embodiment, be subsumed by another application.

As illustrated for exemplary purposes only, memory 204 stores applications and data for enabling the operation of system 100 to provide support for context-sensitive attributes in accordance with the invention to a plurality of business applications. In this exemplary configuration, memory 204 therefore stores an operating system (OS) 302, a communication suite 304, an application server 306, business applications 308a, 308b and 308c (collectively 308) which use context-sensitive attributes 308a, 308b and 308i (collectively 309), and an attribute manager 310 having an attribute repository 312 for storing and managing such attributes 309.

OS 302 is an operating system suitable for operation with selected CPUs 202 and the operations described herein. Multi-tasking, multi-threaded OSes such as, for example IBM AIX™, Microsoft Windows, Linux, or the like, are expected to be preferred in many embodiments. Communication suite 304 provides, through interaction with OS 302 and network I/F 208 (FIG. 2) suitable communication protocols to enable communication with other networked computing devices via network 110 (FIG. 1). Communication suite 304 may include one or more of such protocols such as TCP/IP, Ethernet, token ring and the like.

Application server 306 is a conventional application server that hosts or provides services to business applications 308 which applications incorporate aspects of the present invention. Unlike conventional business applications, business applications 308 are adapted to use context-sensitive attributes 309 in accordance with a feature of the invention. That is, business applications 308 are adapted via a mechanism to enable context-sensitive attributes, the mechanism facilitating use of attribute manager 310 to store to and retrieve from repository 312 attribute values associated with a context value and, preferably, search using an attribute value associated with a context value. However, it will be apparent to those of ordinary skill in the art that for business applications that have not been adapted to use context-sensitive attributes 309, attribute manager 310 may be configured to facilitate such use via either a null context value or a specific application context value as described further herein below. The operation of business applications 308 and their interaction with attribute manager 310 is better understood with reference to FIGS. 5-6 described below.

Attribute manager 310 provides a common mechanism for defining and manipulating attributes 309 regardless of where and how attributes are stored. For example, in an embodiment, attributes 309 may be arranged as member data or profiles for storing to repository 312. Examples of a member are a person, an organization, an organizational unit, or a group of members. Other entities may be similarly represented such as a country, a locality or a container, etc. Each member may have a member profile describing its characteristics and differentiating one member from another within the business applications 308.

In accordance with a feature of the invention, these attributes may be context-sensitive though they need not be. Hence, attribute manager 310 may provide a set of services to act upon and manage profiles of attributes stored to repository 312 including services such as create, read, update, remove, and search members in the repository 312. These services also support managing groups, including assigning members to and unassigning members from groups and querying group membership.

Repository 312 may comprise a database repository using, for example, DB2™ Enterprise Edition from International Business Machine Corporation or Oracle™ Enterprise Edition from Oracle Corporation with a database schema defined by attribute manager 310. As such attribute manager 310 includes a database repository adapter (not shown) to interact with such a database repository.

In accordance with an optional feature, attribute manager 310 facilitates a programmatic way to define new attributes 309 in repository 312. New attributes 309 may be defined in other manners as will be understood by persons skilled in the art such as via configuration files or deployment descriptors (both not shown) for repository 312 in addition or in the alternative to a programmatic manner.

Context-sensitive attributes 309 may be further understood with reference to FIG. 4 which illustrates exemplary context-sensitive attributes 400, namely favoriteFood 402 and preferredCurrency 404 for a member, each of context-sensitive attributes 400 comprising at least one context value 406 and respective at least one attribute value 408 with which each of the at least one context value 406 may be associated. A context value 406 may comprise a null context value (e.g. 409). The example of FIG. 4 illustrates that, with reference to favoriteFood 402, under all circumstances as represented by the null context value, peanut butter sandwich, orange, papaya, and coffee are a particular member's favorite foods. Whereas, tofu, black beans, and lentils are the member's favorite foods in the VegetarianCusine store. Likewise, a Big Double and fries are favorite foods in the BurgerJoint store.

Since attribute manager 310 allows multiple applications to share attribute information, different applications may specify different context values for values of the same attribute. In an embodiment, attribute manager 310 does not provide a mechanism to support conveying the context values specified by one application to another application. As such, the syntax of the context value is defined in accordance with a convention to provide convenient handling for repository 312 and consistency between applications using context-sensitive attributes 309, especially those sharing attribute values with associated context values. In an embodiment of the invention, the convention provides that the context value is represented by a string of the form "xxx.yyy.zzz" where "xxx.yyy" is a string value that identifies an application that originates the context value and "zzz" is a string value which is application specific, providing the context value. For example, in a Java™ based embodiment, the application identifier portion may be composed according to the Java package name of the application. The application identifying portion ("xxx.yyy") may be "com.ibm.Websphere.Commerce" for Websphere Commerce from International Business Machine Corporation. The application specific portion may be arbitrarily selected, such as "store.BurgerJoint" yielding the string: "com.ibm.Websphere.Commerce.store.BurgerJoint". Context value 410 (FIG. 4) is represented in an alternative embodiment of a form of a context string.

It is noted that in the present embodiment, a null context value (i.e. no context) is represented by a null string to provide a convention when working with the interface as described further below. Alternatives to a null string will be apparent to those skilled in the art.

The schema of the supporting repository 312 is adapted to store attribute values and associated context values, for example, as a database table, such as is logically represented in FIG. 4, where each row stores one or more attribute values and, optionally, an associated context value.

In accordance with an embodiment of the invention, attribute manager 310 provides an application programming interface (API) for use, for example, by business applications 308 for creating, storing, retrieving and otherwise manipulating context-sensitive attributes 309 and context values. FIGS. 5A and 5B illustrate Java based methods which provide an exemplary interface Attribute 502 for attributes and an interface ContextAttribute 504 for context-sensitive attributes 309. Methods to support the specification of context values as strings in accordance with the convention are not shown but will be readily apparent to those skilled in the art.

It can be seen from FIGS. 5A and 5B that there are methods for getting or retrieving attribute values and context values, either individually or multiply, for setting attribute values and context values and for adding and otherwise using the objects.

Note that since the interfaces Attribute 502 and Context-Sensitive 504 are implemented by a data object, the methods on the interfaces affect the values of the attribute data object. For instance, invoking a setvalues(contextString, attributevalues) method will set the values associated with a particular context value in the attribute data object. When the data object is passed to attribute manager 310, the data object will be processed to update the attribute values for the attribute stored in the repository 312. This means there may be other attribute values associated with other context values for the same attribute and those values may not be affected by that setValues( ) method call on the attribute data object.

The following is an example of the retrieval of context values and their associated attribute values which may be performed by business applications 308 and attribute manager 310 using the API 502, 504 of FIGS 5A and 5B with reference to exemplary context-sensitive attribute favoriteFood 400. The getvalues( ) method on the Attribute interface returns a list of values which have no context value associated. When getvalues( ) is called to return the member's favorite foods, the following values will be returned: peanut butter sandwich, orange, papaya, coffee.

The getValues(String context) method on the ContextAttribute interface returns a list of values which are associated with the specified context value string. Therefore, getValues ("com.ibm.websphere.commerce.store. VegetarianCuisine") would return tofu, blackbeans, lentils. Likewise, getValues ("com.ibm.websphere.commerce.store. BurgerJoint") would return Big Double and fries.

The getAllValues( ) method on the ContextAttribute interface returns all attribute values regardless of the context value. In the Map of the attribute values returned, the context value strings are used as keys of the Map. The string "com.ibm.attribute.manager" is synonymous with a null context value (or no context). It is a convention that when attribute manager 310 returns attribute values using a Map, values that have no context value will be associated with this key convention.

Numerous modifications to the embodiments described will be apparent to those of ordinary skill in the art which will not depart from the scope of the invention. For example, while the embodiments of the attribute manager described refer to a repository database for persistent storage of the attribute values and associated context values, such need not be included to receive the benefits of context-sensitive attributes 309.

An additional usage of the invention is to exploit the context even without the knowledge of the application requesting the attribute value. For example through one application, a person may provide values for an attribute telephoneNumber to indicate how the person can be reached during different time periods of the day. Another application that has no knowledge of the different time periods may just query the value of the attribute at any given time. A system responsible for returning the attribute value may determine the current time, for example, by obtaining the system time and return to the application the most suitable telephone number depending on the time of day of the application's request.

Context-sensitive attributes 309 of the present invention facilitate hierarchical contexts and default context values as well. Considering again the dessert preference example, a member's favorite dessert may be ice cream, in general, but in Italian restaurants it is gelato and in French restaurants it is crème brulé. In the member's favorite local Italian restaurant, it is lemon cake. Extending the units of measure preference example discussed earlier, a member's preferred unit of measure might be pounds in general, kilograms in a coffee buying application, tonnes in a steel buying application and carats in a diamond buying application, unless the diamonds are of an industrial grade, in which case the preferred units are grams.

The embodiments of the invention described above are intended to be exemplary only. The scope of the invention is therefore intended to be limited solely by the scope of the appended claims.

We claim:

1. A mechanism in a computer system for enabling use of a context-sensitive attribute by a plurality of applications, said mechanism adapted to:
   create a first attribute value for the context-sensitive attribute, wherein the context-sensitive attribute is shared by a plurality of applications;
   create a first context value associated with the first attribute value for defining the applicability of the first attribute value, wherein the first context value is represented by a first identifier that identifies an application that originated the first context value and an application specific value;
   create a second attribute value for the context-sensitive attribute;
   create a second context value associated with the second attribute value for defining the applicability of the second attribute value, wherein the second context value is represented by a second identifier that identifies an application that originated the second context value and an application specific value; and
   retrieve one of the first attribute value and the second attribute value based on receiving one of the first identifier and the second identifier.

2. The mechanism of claim 1 wherein the mechanism is adapted to manipulate the context-sensitive attribute.

3. The mechanism of claim 1 wherein the mechanism is adapted to create a plurality of attribute values for said context-sensitive attribute and at least one said context value, each context value associated with at least one of the attribute values.

4. The mechanism of claim 1 wherein the mechanism is an application programming interface (API).

5. The mechanism of claim 1 wherein the context-sensitive attribute is a data object and the mechanism comprises methods for manipulating the data object.

6. The mechanism of claim 1 wherein each context value is defined in accordance with a convention.

7. The mechanism of claim 5 wherein the convention defines a first portion of the context value in response to an identity of an application defining the context value and a second portion in response to a choice of the said application.

8. The mechanism of claim 1 wherein the mechanism is adapted to create a null context value to define a continual applicability of an associated attribute value.

9. The mechanism of claim 1 wherein the context value is represented by a string.

10. The mechanism of claim 1 wherein the mechanism is adapted to manipulate each attribute value and context value for the plurality of applications sharing the context-sensitive attribute.

11. The mechanism of claim 1 wherein the mechanism is adapted to communicate with a data repository configured for storing each attribute value and each context value, said mechanism storing said context-sensitive attribute to and retrieving said context-sensitive attribute from said data repository.

12. A computer readable medium storing data and instructions for instructing a computer system to provide a mechanism for enabling a context-sensitive attribute for use by a computer application, said mechanism defined in accordance with any one of claims 1-11.

13. A computer system comprising:
    a processor;
    memory; and
    an attribute manager adapted to enable the use of a context-sensitive attribute shared by a plurality of applications, said attribute manager comprising a mechanism for use by said plurality of applications for manipulating said context-sensitive attribute comprising, for each of said plurality of applications, an attribute value and a context value associated with the attribute value for defining the applicability of the attribute value, wherein the context value is represented by an identifier that identifies an application that originated the context value and an application specific value, and wherein the attribute manager is adapted to retrieve the attribute value for a particular application using the identifier that identifies the particular application that originated the context value.

14. The attribute manager of claim 13 wherein the attribute manager is adapted to store the context-sensitive attribute to a data repository.

15. The attribute manager of claim 13 wherein the context-sensitive attribute comprises a plurality of attribute values and at least one said context value, each context value associated with at least one of the attribute values and wherein the mechanism is adapted to manipulate the attribute values and their respective one or more context values.

16. The attribute manager of claim 13 wherein the mechanism is an application programming interface (API).

17. The attribute manager of claim 13 wherein each context value is defined in accordance with a convention.

18. A method of providing a context-sensitive attribute for use by a plurality of applications comprising:
for each of the plurality of applications,
storing an attribute value; and
storing a context value, said context value associated with the attribute value for defining the applicability of the attribute value, wherein the context value is represented by an identifier that identifies an application that originated the context value and an application specific value; and
providing a mechanism for manipulating each attribute value and each context value, wherein manipulating includes retrieving a particular attribute value using a identifier that identifies a particular application that originated a context value.

19. The method of claim 18 wherein the method is adapted to store a plurality of attribute values and at least one said context value, each context value associated with at least one of the attribute values and wherein the mechanism is adapted to manipulate the attribute values and their respective one or more context values.

20. The method of claim 18 wherein the mechanism is an application programming interface (API).

21. The method of claim 18 wherein an attribute value and a context value comprise a data object and the mechanism comprises methods for manipulating said data object.

22. The method of claim 18 wherein a context value is defined in accordance with a convention.

23. The method of claim 18 wherein the convention defines a first portion of the context value in response to an identity of an application defining the context value and second portion in response to a choice of the said application.

24. The method of claim 18 including storing a null context value to define a continual applicability of an associated attribute value.

25. The method of claim 18 wherein each context value is represented by a string.

26. The method of claim 18 wherein the mechanism is adapted to communicate with a data repository configured for each attribute value and each context value, said mechanism adapted for storing each attribute value and each context value to and retrieving each attribute value and each context value from said data repository.

27. The method of claim 21 including providing a definition mechanism for defining the context-sensitive attribute.

* * * * *